Nov. 27, 1934.  H. J. STAGE  1,982,081

ARTIFICIAL BAIT

Filed April 5, 1933

INVENTOR:
HUBERT J. STAGE

BY Saywell & Wesseler,
ATTORNEYS

Patented Nov. 27, 1934

1,982,081

UNITED STATES PATENT OFFICE 1,982,081

ARTIFICIAL BAIT

Hubert J. Stage, Chardon, Ohio

Application April 5, 1933, Serial No. 664,469

3 Claims. (Cl. 43—46)

This invention, as indicated, relates to artificial bait. More particularly, it comprises a fish lure which may be shaped and colored to resemble a variety of animal forms upon which fish feed, such as frogs, minnows, small catfish, and the like. It includes a body member preferably formed of light wood or some similar buoyant material so shaped that as it is drawn through the water it will travel along a substantially uniform line with a lateral oscillatory motion or wiggle simulating the motion of a small swimming fish or the like. The conformation of the device is of a modified streamline shape, the forward face having a forwardly and downwardly inclined surface to hold the wider front end of the object in substantial alinement with the rearward end, so as to cause the same to follow a substantially uniform horizontal line of travel, and having other characteristics to cause the object to swing from side to side as it progresses in a forward direction. The invention also includes the provision of special hook-attaching and line-attaching elements which provide for the ready replacement of hooks in one instance or a change of the line of pull in the other instance.

Heretofore it has been proposed to provide artificial bait having various characteristics as to shape and attaching elements, but such devices in many instances have not been so constructed as to withstand severe usage and have lost the fish after it had been hooked, due to the breakage of the fastening elements, or have been unsatisfactory as fish lures because of the article not simulating the appearance and natural movements of a frog, fish, or the like, such as would attract the fish being sought for.

The principal object of the present invention is to provide an artificial bait which will be so shaped as to have a substantially straight line of movement in the water at a predetermined level, and which will have an oscillatory movement from side to side simulating the swimming movement of a small fish or the like, and which will be of substantial construction not subject to breakage when subjected to sudden and severe strains.

Another object of the invention is to provide an improved configuration of artificial bait which will travel along a substantially uniform horizontal line when moved relatively to the water within which it is placed, and which is adapted for adjustment to several different degrees of submersion beneath the surface of the water.

Another object of the invention is to provide an artificial bait having simple fastening elements for attaching the hooks thereto in a position beneath the artificial bait or at the end thereof, or in either of such positions, which will be of such construction as to be capable of withstanding severe strains such as are occasioned by a fish of heavy weight seizing the bait and thereafter attempting to free itself from the hook through violent jerks and lunges.

Another object of the invention is to provide attaching elements for the hooks which may be readily disengaged from the body of the artificial bait for purposes of replacement of the hooks to change the size thereof, or in the event of injury to the hooks during the use of the device.

Figure 2:
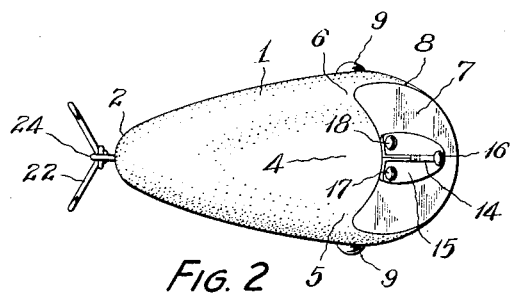
Figure 2 is a top plan view of the structure shown in Figure 1.
Figure 1:
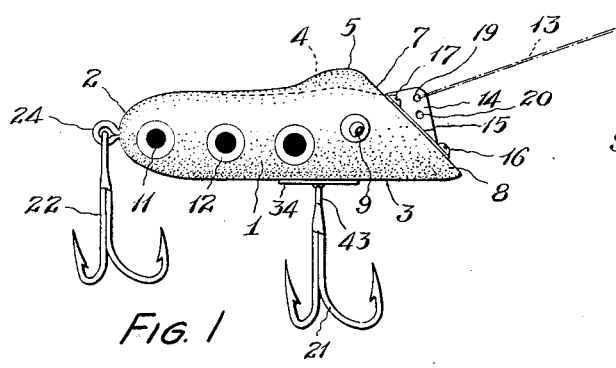
Figure 1 is a side elevation of an artificial bait construction embodying the principles of the invention.
Figure 3:
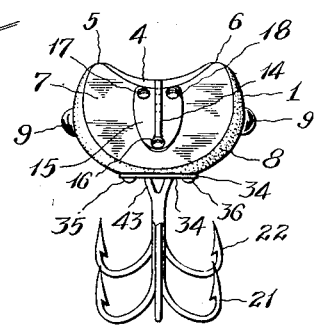
Figure 3 is a front elevation of the structure shown in Figures 1 and 2.
Figure 4:
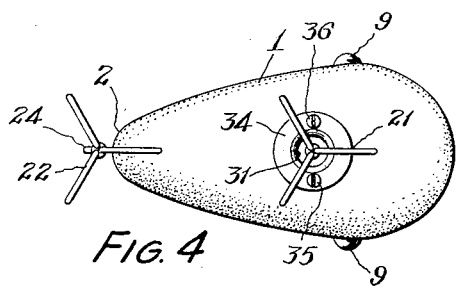
Figure 4 is a bottom plan view of the structure shown in Figures 1, 2 and 3.

The artificial bait is formed of a body portion 1, preferably of wood or some suitable buoyant structure, and is of substantially streamline shape with an enlarged forward portion and a tapered rearward portion, preferably with a rounded end 2. As seen in plan view, the structure is of elongated egg-shape, but as seen in side or end elevation, shows a substantially straight central under surface 3.

The top of the body is of less length than the bottom and is of convex transverse curvature over the greater portion of its longitudinal extent from its lower end, but merges with a transverse concave area 4 adjacent the forward portion of the body intermediate a pair of spaced enlargements or shoulders 5, 6, which thus provide a shallow channelway between the same, through which a flow of water may be directed toward the rearward end.

At the front of the body a downwardly and forwardly inclined plane surface 7 is provided and the adjacent bottom and side surfaces have a curved area 8 extending slightly inwardly around the margins of the inclined front face.

The body may be provided with artificial eyes 9 adjacent the central forward portions of the sides and may have suitable color variations and special markings such as spots 11 and circles 12 to provide the necessary natural appearance of the device to serve as a fish lure.

Centrally of the forward face of the device, a securing terminal for the line 13 is provided, and is preferably in the form of a small plate 14 formed of sheet metal folded centrally to provide an upstanding vertical fin 14 with a flange portion 15 at the bottom and sides of said fin providing a base for securing the terminal to the body. The means for fastening the base to the body preferably comprises three screws 16, 17, 18, and the securing terminal is preferably mounted with its top edge at the top line centrally of the inclined front face 7. Apertures 19, 20, are formed through the fin 14 at different vertical heights and the line may be engaged through either aperture in accordance with the level at which the bait is to be moved.

The body may be provided with one or more hooks and the hooks may be single, paired or gang hooks, but preferably gang hooks providing three barbs are used and two such gang hooks are supported on the body, one hook 21 being at a point slightly forward of the central bottom area and another hook 22 being positioned at the rearward end of the body.

Figure 5:
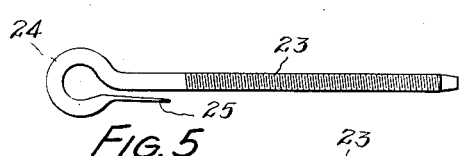
Figure 5 is a side elevation in enlarged detail showing the construction of the fastening member for the end hook in open hook-receiving position.
Figure 6:
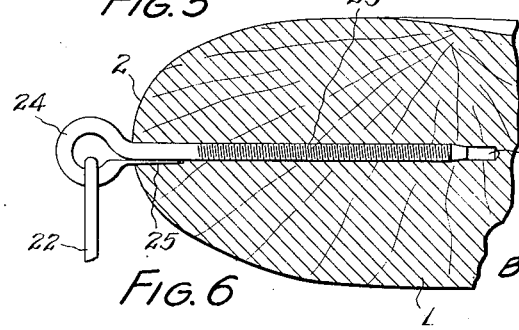
Figure 6 is a view similar to Figure 5 with the fastening member shown in hook-retaining position, a portion of the body member of the artificial bait being shown in section.

In order to provide a secure fastening for the end hook 22, a fastening of the character shown in Figures 5 and 6 is preferably used. In such fastening an elongated shank 23 is provided, screw-threaded over the greater portion of its extent from one end, and formed at its other end with an eye 24 having a tapered tongue 25 formed as a continuation of the free end of said eye and adapted to overlie the adjacent portion of the shank and enter the axial bore 26 formed centrally in the end 2 of the body portion of the device. When the fastening is turned to move outwardly the tongue will be released from clamping position in the bore and the eye may be opened to release the hook. After the hook is replaced, the fastening may be returned to its original position and the tongue will then be held firmly against the shank through the clamping action of the walls of the bore, and the eye 24 cannot be spread to release the hook through any strain applied to the hook.

Figure 8:
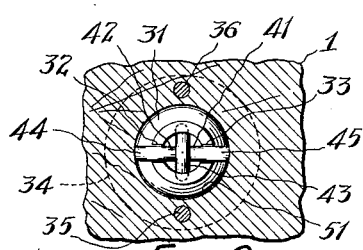
Figure 8 is a top plan view, partly in section, of the structure shown in Figure 7, taken along the line 8—8, indicated in Figure 7, looking in the direction of the arrows.
Figure 7:
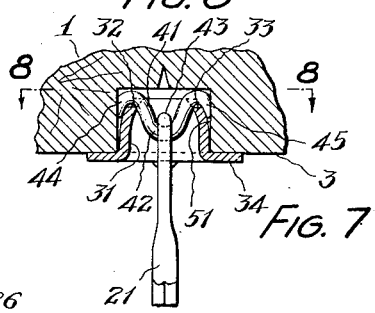
Figure 7 is an enlarged sectional view showing the forward hook support in engagement with its associated parts.

The bottom hook 21 is preferably secured to the under side of the body portion of the device by a special fastening shown more particularly in Figures 7 and 8. Said fastening means comprises a hollow substantially cylindrical metal body member 31 slightly rounded adjacent its upper portion and formed with notched seats 32, 33, at opposite sides of its upper edge for a purpose presently to be described. At its opposite or lower portion, said cylindrical member is formed with an outwardly turned circumferential flange 34. The flange is preferably secured to the body by means of screws 35, 36, engaged through apertures on opposite sides of said flange and preferably along a line at right angles to the line along which the seats at the upper edge of the member are located. The hook 21 is supported in limited swinging position beneath the body portion by means of a bar 41 formed of a short length of wire with a central portion 42 of inverted U-shape to receive the eye 43 of the hook 21 and with outwardly and downwardly turned ends 44, 45, to engage the notched seats 32, 33, at the upper edge of the cylindrical body member.

The fastening member 31 as is clearly shown in Figures 7 and 8 is received within a shallow recess 51 in the under side of the body with the flange 34 bearing against the adjacent lower surface of the body. The hook has free oscillating movement on the bar and the sides of the hollow cylindrical member 31 prevent wear and chafing on the margins of the recess.

When a change of hook size is desired or when an injured hook has to be replaced, the screws 35, 36, can be readily removed, and the fastening withdrawn from the recess. The bar 41 can then be lifted from the notched seats 32, 33, and the bar withdrawn from the hook eye 43. The parts can be reassembled very readily in the same manner and the new hook will have as secure a fastening to the body as the one previously used. Inasmuch as the parts of the device are each of adequate size and are provided with ample supports to prevent accidental dislodgment, very severe and sudden strains may be placed upon the hook and fastening without danger of breakage, and the consequent loss of the fish which has been hooked.

The body, as stated, may be made of any suitable material, but is preferably made of wood which may be specially impregnated or otherwise treated to render it waterproof and uniformly buoyant and receptive to various finishes.

The securing terminal for the line, as stated, provides two apertures, so that the point of attachment for the line may be varied as desired. At whichever point the line is attached, the device will follow a substantially horizontal path at an even depth due to what may be described as a vortex action at the rearward end of the device caused by a portion of the water flowing over the top surface of the device between the enlargements or shoulders 5, 6. This stabilizing effect as to depth with the lateral oscillation of the device makes a very practical structure for the purpose specified, and with the easy substitution and replacement of parts, provides in a single device all the elements of strength and adaptability so essential for conditions of hard service at the fishing grounds.

I claim:

1. An artificial bait of substantially streamline contour having a body portion with an enlarged forward end presenting a pair of spaced shoulders with an intermediate channel centrally of the top forward portion of said body and a single downwardly and forwardly extending plane surface, a line attaching plate secured centrally only of said surface, and a hook supported at the lower portion of said artificial bait.

2. An artificial bait of substantially streamline contour having a body portion with an enlarged forward end presenting a downwardly and forwardly extending plane surface, and a pair of spaced shoulders with an intermediate channel centrally of the top forward portion of said body, a line attaching plate secured centrally of said surface, a recess formed in the under side of said bait, a substantially cylindrical supporting member engaged within said recess and having notched seats at its upper edge and having at its outer edge an outwardly turned circumferential flange adapted to bear against the marginal area about said recess, securing elements engaged through said flange, a hook supporting element engaged across the opposite end of said cylindrical member with its ends resting in said seats, and a hook engaged in said hook supporting element.

3. A fastening element for securing a hook to an artificial bait body comprising a substantially cylindrical supporting member adapted to be engaged within a shallow recess in the body of the artificial bait, notched seats at the upper edge of said member, an outwardly extending flange formed circumferentially about the opposite end of said member, a hook supporting element in the form of a substantially U-shaped bar with outwardly and downwardly turned ends to provide hook-like members adapted to be engaged over the edge of said cylindrical member within said notched seats and held from upward displacement by engagement against the bottom wall of the shallow recess in said body, and means for applying fastening elements provided on said flange.

HUBERT J. STAGE.